(12) United States Patent
Salah et al.

(10) Patent No.: US 11,627,567 B2
(45) Date of Patent: Apr. 11, 2023

(54) METHOD AND APPARATUS FOR PDCCH MONITORING CONFIGURATION FOR CARRIER AGGREGATION IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 86 days.

(21) Appl. No.: 17/213,202

(22) Filed: Mar. 25, 2021

(65) Prior Publication Data
US 2021/0337520 A1    Oct. 28, 2021

Related U.S. Application Data

(60) Provisional application No. 63/015,827, filed on Apr. 27, 2020.

(51) Int. Cl.
*H04W 72/04*      (2009.01)
*H04L 5/00*       (2006.01)

(52) U.S. Cl.
CPC .......... *H04W 72/042* (2013.01); *H04L 5/001* (2013.01)

(58) Field of Classification Search
CPC . H04W 72/042; H04W 72/048; H04W 24/08; H04W 24/10; H04L 5/001; H04L 5/0094; H04L 5/0053
See application file for complete search history.

(56) References Cited

U.S. PATENT DOCUMENTS

2019/0363843 A1* 11/2019 Gordaychik .......... H04W 52/58
2021/0321366 A1* 10/2021 Hosseini ............... H04L 5/0053

* cited by examiner

*Primary Examiner* — Ayaz R Sheikh
*Assistant Examiner* — Debebe A Asefa
(74) *Attorney, Agent, or Firm* — Han IP PLLC; Andy M. Han

(57) ABSTRACT

Various solutions for physical downlink control channel (PDCCH) monitoring configuration for carrier aggregation (CA) with respect to user equipment and network apparatus in mobile communications are described. An apparatus may transmit a capability report to indicate a plurality of monitoring combinations of PDCCH monitoring capabilities to a network node. The apparatus may receive a monitoring combination configured by the network node based on the capability report. The apparatus may determine a monitoring budget by using the configured monitoring combination. The apparatus may perform a PDCCH monitoring according to the monitoring budget.

18 Claims, 5 Drawing Sheets

US 11,627,567 B2

METHOD AND APPARATUS FOR PDCCH MONITORING CONFIGURATION FOR CARRIER AGGREGATION IN MOBILE COMMUNICATIONS

CROSS REFERENCE TO RELATED PATENT APPLICATION(S)

The present disclosure is part of a non-provisional patent application claiming the priority benefit of U.S. Provisional Patent Application No. 63/015,827, filed on 27 Apr. 2020, the content of which being incorporated by reference in its entirety.

TECHNICAL FIELD

The present disclosure is generally related to mobile communications and, more particularly, to physical downlink control channel (PDCCH) monitoring configuration for carrier aggregation (CA) with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), PDCCH candidates refers to the area in the downlink resource grid where PDCCH may be carried. The UE needs to perform blind decoding throughout these PDCCH candidates trying to find PDCCH data (e.g., downlink control information (DCI)). PDCCH candidates to be monitored are configured for a UE by means of search space sets. Monitoring a large number of PDCCH candidates increases the UE complexity. Therefore, NR specifies the maximum number of PDCCH candidates that require blind decodes and the maximum number of control channel elements (CCEs) that require channel estimations. This limit the UE complexity to a reasonable level with an acceptable restriction on the search space sets for PDCCH monitoring.

In Release-15 (Rel-15) of the $3^{rd}$ Generation Partnership Project (3GPP) technical specification for NR, the limit on the maximum number of PDCCH candidates to monitor in CA scenarios is defined per slot. The maximum number of non-overlapped CCEs or blind decodings (BDs) is specified per slot. In Release-16 (Rel-16) of the 3GPP technical specification for NR, an increased PDCCH monitoring capability on the number of non-overlapped CCEs is proposed for better latency. The explicit limitation on the maximum number of non-overlapping CCEs or BDs is specified per monitoring span.

For the cases with mix between Rel-15 monitoring capability and Rel-16 monitoring capability on different serving cells, the UE should report its capability for supporting the Rel-15 monitoring capability and its capability for supporting the Rel-16 monitoring capability. The UE may report one or more than one monitoring combinations as UE capability. Based on the UE reported monitoring combinations, the network node (e.g., gNB) will configure the UE with a specific number of Rel-15 and Rel-16 component carriers (CCs).

However, some issues may happen under such scenario and need to be resolved/defined. For example, how the UE knows about the gNB selected monitoring combination? And how the UE will use this information? Could the gNB configure the UE with a monitoring combination different to the reported monitoring combinations? The monitoring combinations reported by the UE are the maximum capabilities the UE can support. The gNB may not always configure the maximum CCs for the UE to monitor. The gNB may configure less CCs to the UE. Thus, if the number of CCs configured is larger or different from the UE reported capabilities, the UE needs to know which reported monitoring combination should be used for CCEs/BDs budgets scaling. Therefore, it is needed for the UE to know which reported monitoring combination should be used for the scaling and determining the PDCCH monitoring budgets.

Accordingly, how to determine/configure the PDCCH monitoring configuration in CA scenarios for the UE to perform PDCCH monitoring becomes an important issue for the newly developed wireless communication network. Therefore, there is a need to provide proper configuration for the UE to know which reported monitoring combination should be used for the scaling and determining the PDCCH monitoring budgets.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to PDCCH monitoring configuration for CA with respect to user equipment and network apparatus in mobile communications.

In one aspect, a method may involve an apparatus transmitting a capability report to indicate a plurality of monitoring combinations of PDCCH monitoring capabilities to a network node. The method may also involve the apparatus receiving a monitoring combination configured by the network node based on the capability report. The method may further involve the apparatus determining a monitoring budget by using the configured monitoring combination. The method may further involve the apparatus performing a PDCCH monitoring according to the monitoring budget. Each of the monitoring combinations comprises a first supported number of component carriers with a first PDCCH monitoring capability and a second supported number of CCs with a second PDCCH monitoring capability.

In one aspect, an apparatus may comprise a transceiver which, during operation, wirelessly communicates with network nodes of a wireless network. The apparatus may also comprise a processor communicatively coupled to the transceiver. The processor, during operation, may perform operations comprising transmitting, via the transceiver, a capability report to indicate a plurality of monitoring combinations of physical downlink control channel (PDCCH) monitoring capabilities to a network node. The processor may also perform operations comprising receiving, via the transceiver, a monitoring combination configured by the network node based on the capability report. The processor may further perform operations comprising determining a monitoring budget by using the configured monitoring combination. The processor may further perform operations comprising performing a PDCCH monitoring according to the monitoring budget. Each of the monitoring combinations comprises a first supported number of component carriers with a first PDCCH monitoring capability and a second supported number of CCs with a second PDCCH monitoring capability.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to PDCCH monitoring configuration for CA with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, PDCCH candidates refers to the area in the downlink resource grid where PDCCH may be carried. The UE needs to perform blind decoding throughout these PDCCH candidates trying to find PDCCH data (e.g., DCI). PDCCH candidates to be monitored are configured for a UE by means of search space sets. Monitoring a large number of PDCCH candidates increases the UE complexity. Therefore, NR specifies the maximum number of PDCCH candidates that require blind decodes and the maximum number of CCEs that require channel estimations. This limit the UE complexity to a reasonable level with an acceptable restriction on the search space sets for PDCCH monitoring.

In Rel-15 of the 3GPP technical specification for NR, the limit on the maximum number of PDCCH candidates to monitor in CA scenarios is defined per slot. The maximum number of non-overlapped CCEs or BDs is specified per slot. In Rel-16 of the 3GPP technical specification for NR, an increased PDCCH monitoring capability on the number of non-overlapped CCEs is proposed for better latency. The explicit limitation on the maximum number of non-overlapping CCEs or BDs is specified per monitoring span.

Figure 1:
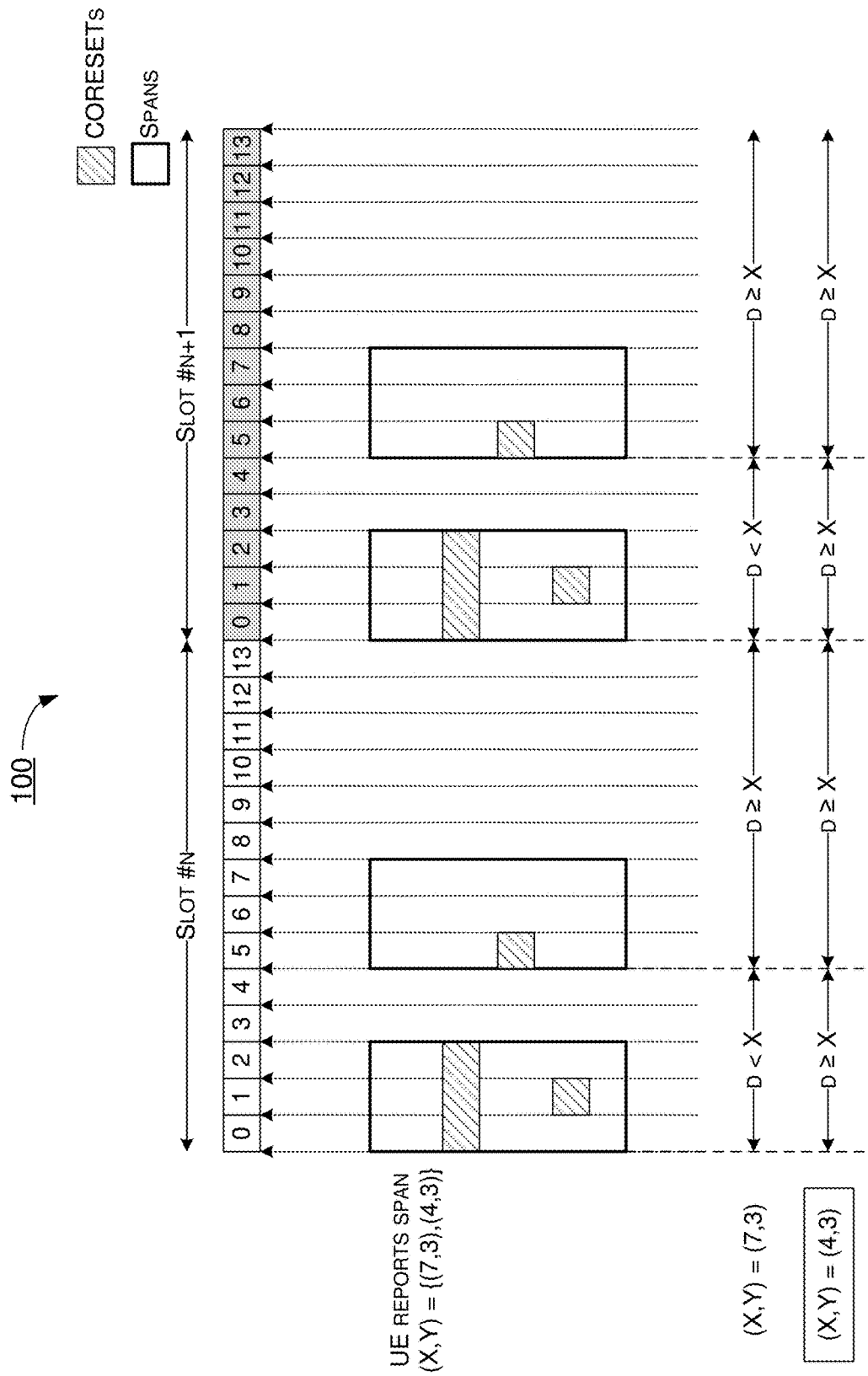
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a plurality of network nodes, which may be a part of a wireless communication network (e.g., an LTE network, a 5G network, an NR network, an IoT network, an NB-IoT network or an IIoT network). The span-based monitoring is used in Rel-16 for the explicit BDs/CCEs budgets. The UE reports one or more combinations of (X, Y) number of symbols, where X≥Y, for PDCCH monitoring. A span is a set of consecutive symbols in a slot in which the UE is configured to monitor PDCCH candidates. The UE supports PDCCH monitoring occasions in any symbol of a slot with minimum time separation of X symbols between the first symbol of two consecutive spans, including across slots. The duration of a span is $d_{span}$=max $(d_{CORESET,max}, Y_{min})$ where $d_{CORESET,max}$ is a maximum duration among durations of CORESETs that are configured to the UE and $Y_{min}$ is a minimum value of Y in the combinations of (X, Y) that are reported by the UE. A last span in a slot can have a shorter duration than other spans in the slot. A UE capability for PDCCH monitoring per slot or per span on an active downlink (DL) bandwidth part (BWP) of a serving cell is defined by a maximum number of PDCCH candidates and non-overlapped CCEs the UE can monitor per slot or per span, respectively, on the active DL BWP of the serving cell.

Scenario 100 illustrates an example of span determination. The UE may report the spans it can support. For example, the UE may report the supported span (X, Y)={(7,3),(4,3)} to the network node. The network node may select at least one of them and configure the selected span to the UE. A particular PDCCH monitoring configuration that meets the UE capability limitation may be configured if the span arrangement satisfies the gap separation for at least one (X, Y) in the UE reported candidate value set in every slot, including cross slot boundary. For example, the network node may determine that span duration=max{maximum value of all CORESET durations, min of Y}=max{3,3}=3.

The span arrangement does not satisfy the gap separation for (X, Y)=(7,3) and can satisfy the gap separation for (X, Y)=(4,3). Therefore, the PDCCH monitoring configuration corresponding to monitoring span (X, Y)=(4,3) can be configured to the UE by the network node.

Figure 2:
FIG. 2 is a diagram depicting an example table of CCEs and BDs budgets under schemes in accordance with implementations of the present disclosure.

In Rel-15, the maximum number of non-overlapped CCEs and the maximum number of monitored PDCCH candidates (e.g., the maximum number of BDs) are specified per slot for different sub-carrier spacing (SCS) (e.g., μ=0, 1, 2 or 3). In Rel-16, the maximum number of non-overlapped CCEs and the maximum number of monitored PDCCH candidates (e.g., the maximum number of BDs) are specified per span for combinations of (X, Y) and different SCS (e.g., μ=0 or 1). FIG. 2 illustrates an example table 200 under schemes in accordance with implementations of the present disclosure. Table 200 illustrates the CCEs budgets and BDs budgets corresponding to the Rel-15 slot-based configuration and the Rel-16 span-based configuration respectively. 3 monitoring spans are introduced in Rel-16 including (2, 2), (4, 3) and (7, 3). The UE may be configured to determine the CCEs budgets and BDs budgets according to table 200 which is also defined in the 3GPP technical specification for NR.

Figure 3:
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a plurality of network nodes, which may be a part of a wireless communication network (e.g., an LTE network, a 5G network, an NR network, an IoT network, an NB-IoT network or an IIoT network). Scenario 300 illustrates an example of CCEs/BDs budgets determination. The CCEs/BDs budgets are defined per span in Rel-16 for SCS=15 kHz (e.g., μ=0) and 30 kHz (e.g., μ=1). Assuming that the PDCCH monitoring configuration corresponding to monitoring span (X,Y)=(4,3) is configured and the SCS is 15 kHz, the UE may be configured to determine the CCEs/BDs budgets according to table 200 defined in 3GPP technical specification for NR. As shown in FIG. 3, for (X,Y)=(4,3) and SCS=15 kHz, the UE may determine that the CCE budgets is equal to 36 and the BDs budgets is equal to 28 for each span.

For the cases with mix between Rel-15 monitoring capability and Rel-16 monitoring capability on different serving cells, the UE should report its capability for supporting the Rel-15 monitoring capability (e.g., pdcch-BlindDetectionCA-R15) and its capability for supporting the Rel-16 monitoring capability (e.g., pdcch-BlindDetectionCA-R16). The UE may report one or more than one monitoring combinations of (pdcch-BlindDetectionCA-R15, pdcch-BlindDetectionCA-R16) as UE capability. Based on the UE reported monitoring combinations, the network node (e.g., gNB) will configure the UE with a specific number of Rel-15 and Rel-16 CCs. However, some issues may happen under such scenario and need to be resolved/defined. For example, how the UE knows about the gNB selected monitoring combination? And how the UE will use this information? Could the gNB configure the UE with a monitoring combination different to the reported monitoring combinations? The monitoring combinations reported by the UE are the maximum capabilities the UE can support. The gNB may not always configure the maximum CCs for the UE to monitor. The gNB may configure less CCs to the UE. Thus, if the number of CCs configured is larger or different from the UE reported capabilities, the UE needs to know which reported monitoring combination should be used for CCEs/BDs budgets scaling. Therefore, it is needed for the UE to know which reported monitoring combination should be used for the scaling and determining the PDCCH monitoring budgets.

In view of the above, the present disclosure proposes a number of schemes pertaining to PDCCH monitoring configuration for CA with respect to the UE and the network apparatus. According to the schemes of the present disclosure, the UE may be configured to transmit a capability report to indicate more than one monitoring combinations of PDCCH monitoring capabilities to the network node. The network node will determine/select a monitoring combination based on the UE reported monitoring combinations. The network node will configure/signal to the UE a specific number of Rel-15 CCs and Rel-16 CCs. Then, the UE may be able to know the specific monitoring combination used by the network node and use such information to determining PDCCH monitoring budgets and perform PDCCH monitoring accordingly. Accordingly, by introducing extra signalling, the network node may signal the UE the monitoring combination determined by the network node. The UE may perform PDCCH monitoring correctly to avoid uncertainty and ambiguity. The design complexity at the UE may also be reduced and limited.

Specifically, the UE may be configured to transmit a capability report to indicate a plurality of monitoring combinations of PDCCH monitoring capabilities to a network node. Each of the monitoring combinations may comprise a first supported number of CCs with a first PDCCH monitoring capability and a second supported number of CCs with a second PDCCH monitoring capability. The first PDCCH monitoring capability may comprise a slot-based PDCCH monitoring capability. The second PDCCH monitoring capability may comprise a span-based PDCCH monitoring capability. For example, the first PDCCH monitoring capability may be a Release-15 PDCCH blind detection capability (e.g., pdcch-BlindDetectionCA-R15). The second PDCCH monitoring capability may be a Release-16 PDCCH blind detection capability (e.g., pdcch-BlindDetectionCA-R16).

After receiving the capability report from the UE, the network node may select/determine a monitoring combination based on the reported monitoring combinations. For example, the configured monitoring combination for scaling of the PDCCH monitoring capability may be selected from the plurality of combinations indicated by the UE capability report. In another example, the configured monitoring combination for scaling of the PDCCH monitoring capability may be different from the plurality of combinations indicated by the UE capability report. Then, the network may be configured to indicate/configure the determined/selected monitoring combination the UE. The network node may use a radio resource control (RRC) signaling and a physical layer signaling to configure the monitoring combination.

The UE may be configured to receive the configured monitoring combination configured by the network node based on the capability report. The configured monitoring combination may be received in response to that a number of CCs configured is larger than a reported PDCCH monitoring capability. The configured monitoring combination may comprise a combination indicator of PDCCH blind detection for carrier aggregation (e.g., pdcch-BlindDetectionCA-CombIndicator). This combination indicator is used to configure one monitoring combination of pdcch-BlindDetectionCA1 (for Rel-15) and pdcch-BlindDetectionCA2 (for Rel-16) for the UE to use for scaling PDCCH monitoring capability if the number of serving cells configured to a UE is larger than the reported capability, and if the UE reports more than one monitoring combinations of pdcch-BlindDetectionCA-R15 and pdcch-BlindDetectionCA-R16 as UE capability. The monitoring combination of pdcch- BlindDetectionCA1 and pdcch-BlindDetectionCA2 configured by pdcch-BlindDetectionCACombIndicator may be from the more than one monitoring combinations of pdcch-BlindDetectionCA1 and pdcch-BlindDetectionCA2 reported by the UE.

The UE may be configured to determine a monitoring budget (e.g., maximum number of non-overlapping CCEs or BDs) by using the configured monitoring combination to scale the PDCCH monitoring capabilities. The UE may determine a first number of CCs to monitor with the first PDCCH monitoring capability and a second number of CCs to monitor with the second PDCCH monitoring capability. For example, the UE may use the Rel-15 formula for CCEs/BDs budget to determining the PDCCH monitoring budget according to pdcch-BlindDetectionCA1 (for Rel-15). The UE may use the Rel-16 formula for CCEs/BDs budget to determining the PDCCH monitoring budget according to pdcch-BlindDetectionCA1 (for Rel-15). Then, the UE may perform the PDCCH monitoring according to the monitoring budget.

In some implementations, the UE may support and be configured with 8 CCs. However, the UE may not monitor PDCCH on all 8 cells. The UE may support multiple monitoring combinations and reports the monitoring combinations (A, B) it can support to the network node. A is the number of Rel-15 CCs (e.g., slot based monitoring) and B is the number of Rel-16 CCs (e.g., with span based monitoring). In 3GPP specifications, A may be indicated by the parameter pdcch-BlindDetectionCA-R15 and B may be indicated by the parameter pdcch-BlindDetectionCA-R16. For example, the UE may report three monitoring combinations comprising (6, 1), (4, 2) and (2, 3). The monitoring combination (6, 1) means that the UE can support 6 CCs with Rel-15 capability and 1 CC with Rel-16 capability. The monitoring combination (4, 2) means that the UE can support 4 CCs with Rel-15 capability and 2 CCs with Rel-16 capability. The monitoring combination (2, 3) means that the UE can support 2 CCs with Rel-15 capability and 3 CCs with Rel-16 capability.

Assuming that the network node configures the UE with (5, 1) or another monitoring combination different from the reported monitoring combinations (but still the network node can't configure the UE with a monitoring combination above its monitoring capability). The UE needs to know which monitoring combination among the reported ones to use for the scaling in the CCEs/BDs budgets formula. Thus, the network node needs to signal/configure the UE with one of its reported monitoring combinations to use for the scaling (e.g., pdcch-BlindDetectionCA-CombIndicator). The pdcch-BlindDetectionCA-CombIndicator may comprise a first parameter pdcch-BlindDetectionCA1 and a second parameter pdcch-BlindDetectionCA2.

In some implementations, for the case with Rel-15 monitoring capability and Rel-16 monitoring capability on different serving cells (i.e., case 3), the UE will report one or more monitoring combination of (pdcch-BlindDetectionCA-R15, pdcch-BlindDetectionCA-R16) as UE capability. If the UE reports more than one monitoring combination of (pdcch-BlindDetectionCA-R15, pdcch-BlindDetectionCA-R16), gNB will configure which monitoring combination for the UE to use for scaling PDCCH monitoring capability if the number of CCs configured is larger than the reported capability.

Illustrative Implementations

Figure 4:
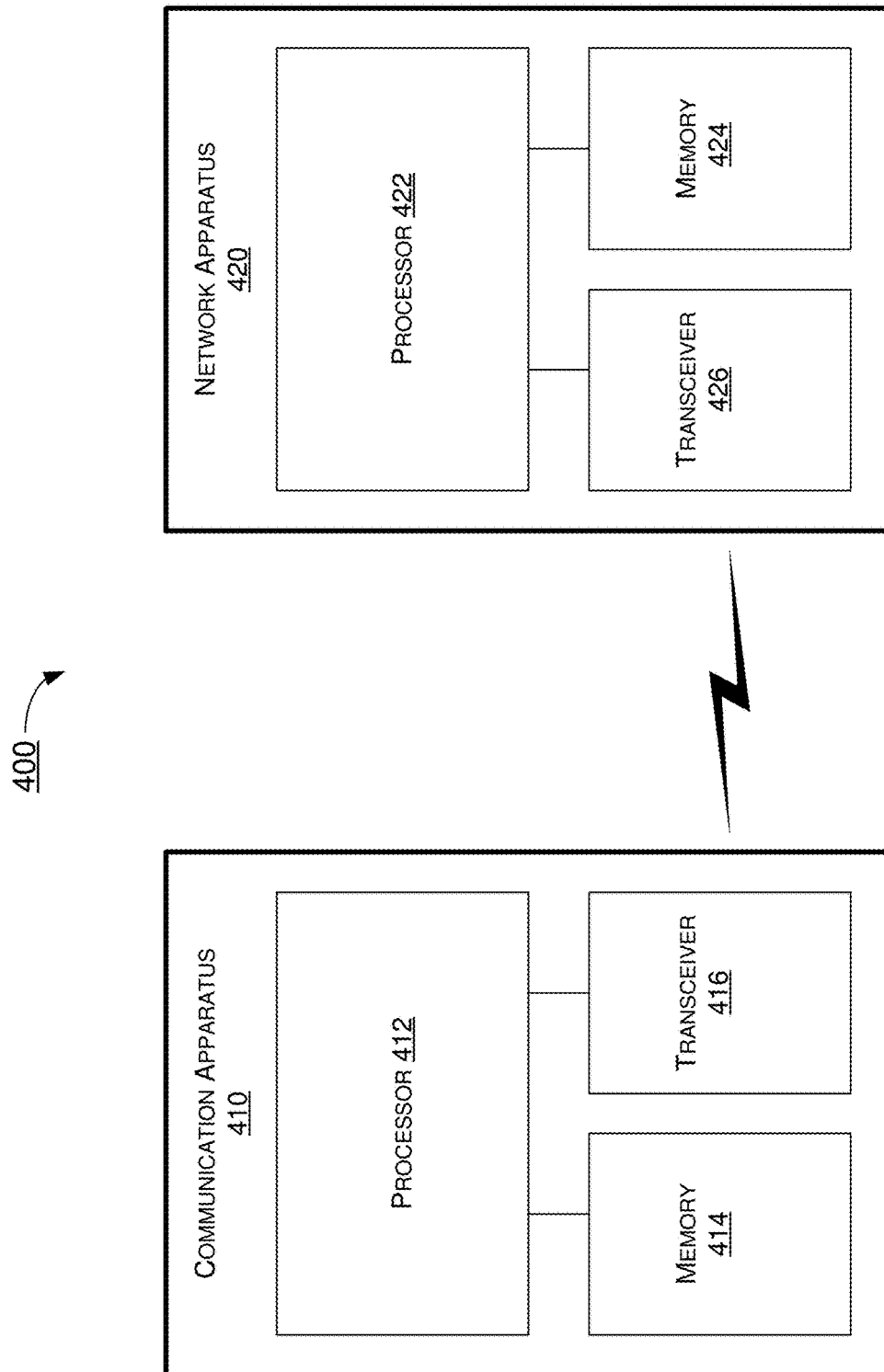
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to PDCCH monitoring configuration for CA with respect to user equipment and network apparatus in wireless communications, including scenarios/schemes described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT, NB-IoT or IIoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 may be configured to transmit, via transceiver 416, a capability report to indicate a plurality of monitoring combinations of PDCCH monitoring capabilities to network apparatus 420. Each of the monitoring combinations transmitted by processor 412 may comprise a first supported number of CCs with a first PDCCH monitoring capability and a second supported number of CCs with a second PDCCH monitoring capability. The first PDCCH monitoring capability may comprise a slot-based PDCCH monitoring capability. The second PDCCH monitoring capability may comprise a span-based PDCCH monitoring capability. For example, the first PDCCH monitoring capability may be a Release-15 PDCCH blind detection capability (e.g., pdcch-BlindDetectionCA-R15). The second PDCCH monitoring capability may be a Release-16 PDCCH blind detection capability (e.g., pdcch-BlindDetectionCA-R16).

In some implementations, after receiving the capability report from communication apparatus 410, processor 422 may select/determine a monitoring combination based on the reported monitoring combinations. For example, processor 422 may select the monitoring combination from the plurality of monitoring combinations indicated by communication apparatus 410. In another example, processor 422 may determine a monitoring combination different from the plurality of monitoring combinations indicated by communication apparatus 410. Then, processor 422 may be configured to indicate/configure, via transceiver 426, the determined/selected monitoring combination to communication apparatus 410. Processor 422 may use an RRC signaling and a physical layer signaling to configure the monitoring combination.

In some implementations, processor 412 may be configured to receive, via transceiver 416, the configured monitoring combination configured by network apparatus 420 based on the capability report. Processor 412 may receive the configured monitoring combination in response to that a number of CCs configured is larger than a reported PDCCH monitoring capability. The configured monitoring combination received by processor 412 may comprise a combination indicator of PDCCH blind detection for carrier aggregation (e.g., pdcch-BlindDetectionCA-CombIndicator). Communication apparatus 420 may use this combination indicator to configure one monitoring combination of pdcch-BlindDetectionCA1 (for Rel-15) and pdcch-BlindDetectionCA2 (for Rel-16) for communication apparatus 420 to use for scaling PDCCH monitoring capability if the number of serving cells configured to communication apparatus 420 is larger than the reported capability, and if communication apparatus 420 reports more than one monitoring combinations of pdcch-BlindDetectionCA-R15 and pdcch-BlindDetectionCA-R16 as its capability. The monitoring combination of pdcch-BlindDetectionCA1 and pdcch-BlindDetectionCA2 configured by pdcch-BlindDetectionCACombIndicator may be from the more than one monitoring combinations of pdcch-BlindDetectionCA1 and pdcch-BlindDetectionCA2 reported by communication apparatus 420.

In some implementations, processor 412 may be configured to determine a monitoring budget (e.g., maximum number of non-overlapping CCEs or BDs) by using the configured monitoring combination to scale the PDCCH monitoring capabilities. Processor 412 may determine a first number of CCs to monitor with the first PDCCH monitoring capability and a second number of CCs to monitor with the second PDCCH monitoring capability. For example, processor 412 may use the Rel-15 formula for CCEs/BDs budget to determining the PDCCH monitoring budget according to pdcch-BlindDetectionCA1 (for Rel-15). Processor 412 may use the Rel-16 formula for CCEs/BDs budget to determining the PDCCH monitoring budget according to pdcch-BlindDetectionCA1 (for Rel-15). Then, processor 412 may perform, via transceiver 416, the PDCCH monitoring according to the monitoring budget.

In some implementations, processor 412 may support and be configured with 8 CCs. However, processor 412 may not monitor PDCCH on all 8 cells. Processor 412 may support multiple monitoring combinations and reports the monitoring combinations (A, B) it can support to the network node. A is the number of Rel-15 CCs (e.g., slot based monitoring) and B is the number of Rel-16 CCs (e.g., with span based monitoring). In 3GPP specifications, A may be indicated by the parameter pdcch-BlindDetectionCA-R15 and B may be indicated by the parameter pdcch-BlindDetectionCA-R16. For example, processor 412 may report three monitoring combinations comprising (6, 1), (4, 2) and (2, 3). The monitoring combination (6, 1) means that processor 412 can support 6 CCs with Rel-15 capability and 1 CC with Rel-16 capability. The monitoring combination (4, 2) means that processor 412 can support 4 CCs with Rel-15 capability and 2 CCs with Rel-16 capability. The monitoring combination (2, 3) means that processor 412 can support 2 CCs with Rel-15 capability and 3 CCs with Rel-16 capability.

In some implementations, assuming that network apparatus 420 configures processor 412 with (5, 1) or another monitoring combination different from the reported monitoring combinations (but still network apparatus 420 can't configure processor 412 with a monitoring combination above its monitoring capability). Processor 412 needs to know which monitoring combination among the reported ones to use for the scaling in the CCEs/BDs budgets formula. Thus, network apparatus 420 needs to signal/configure processor 412 with one of its reported monitoring combinations to use for the scaling (e.g., pdcch-BlindDetectionCA-CombIndicator). The pdcch-BlindDetectionCA-CombIndicator may comprise a first parameter pdcch-BlindDetectionCA1 and a second parameter pdcch-BlindDetectionCA2.

Illustrative Processes

Figure 5:
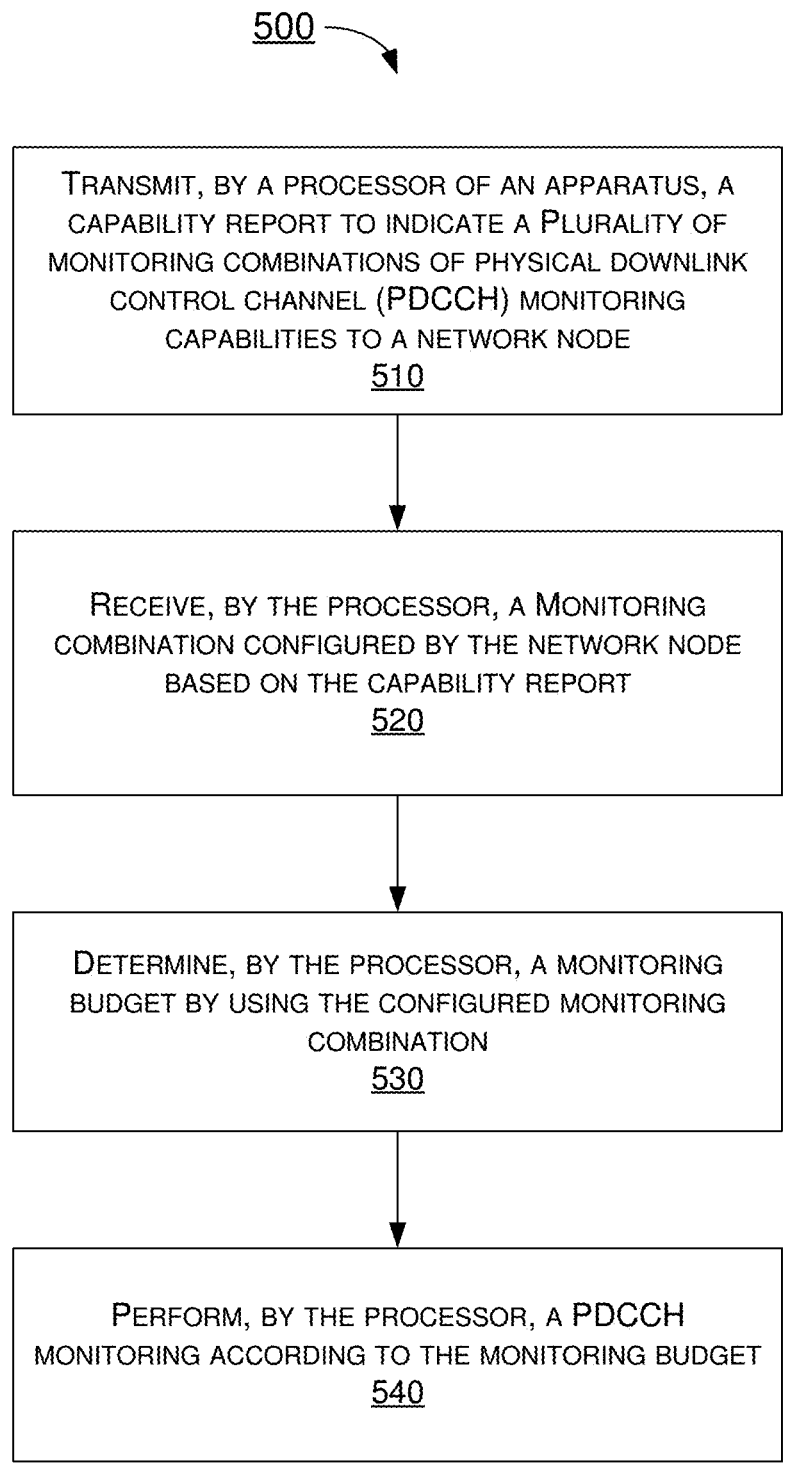
FIG. 5 is a flowchart of an example process in accordance with an implementation of the present disclosure.

FIG. 5 illustrates an example process 500 in accordance with an implementation of the present disclosure. Process 500 may be an example implementation of schemes described above, whether partially or completely, with respect to PDCCH monitoring configuration for CA with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve processor 412 of apparatus 410 transmitting a capability report to indicate a plurality of monitoring combinations of PDCCH monitoring capabilities to a network node. Each of the monitoring combinations comprises a first supported number of CCs with a first PDCCH monitoring capability and a second supported number of CCs with a second PDCCH monitoring capability. Process 500 may proceed from 510 to 520.

At 520, process 500 may involve processor 412 receiving a monitoring configuration configured by the network node based on the capability report. Process 500 may proceed from 520 to 530.

At 530, process 500 may involve processor 412 determining a monitoring budget by using the configured monitoring combination. Process 500 may proceed from 530 to 540.

At 540, process 500 may involve processor 412 performing a PDCCH monitoring according to the monitoring budget.

In some implementations, the configured monitoring combination for scaling of the PDCCH monitoring capability may be selected from the plurality of monitoring combinations indicated by the capability report.

In some implementations, the first PDCCH monitoring capability may comprise a slot-based PDCCH monitoring capability. The second PDCCH monitoring capability may comprise a span-based PDCCH monitoring capability.

In some implementations, the first PDCCH monitoring capability may comprise a Release-15 PDCCH blind detection capability. The second PDCCH monitoring capability may comprise a Release-16 PDCCH blind detection capability.

In some implementations, the configured monitoring combination for scaling of the PDCCH monitoring capability may be received in response to that a number of CCs configured is larger than a reported PDCCH monitoring capability.

In some implementations, process 500 may involve processor 412 receiving the configured monitoring combination for scaling of the PDCCH monitoring capability via at least one of an RRC signaling and a physical layer signaling.

In some implementations, process 500 may involve processor 412 determining the monitoring budget by using the configured monitoring combination to scale the PDCCH monitoring capabilities.

In some implementations, the configured monitoring combination may be different from the plurality of monitoring combinations indicated by the capability report.

In some implementations, the configured monitoring combination may comprise a combination indicator of PDCCH blind detection under carrier aggregation.

In some implementations, process 500 may involve processor 412 determining a first number of CCs to monitor with the first PDCCH monitoring capability and a second number of CCs to monitor with the second PDCCH monitoring capability.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a processor of an apparatus, a capability report to indicate a plurality of monitoring combinations of physical downlink control channel (PDCCH) monitoring capabilities to a network node;
   receiving, by the processor, a monitoring combination configured by the network node based on the capability report;
   determining, by the processor, a monitoring budget by using the configured monitoring combination; and
   performing, by the processor, a PDCCH monitoring according to the monitoring budget by using the monitoring combination configured by the network node responsive to a number of component carriers (CCs) configured being larger than a reported capability,
   wherein each of the monitoring combinations comprises a first supported number of CCs with a first PDCCH monitoring capability and a second supported number of CCs with a second PDCCH monitoring capability, and
   wherein the receiving comprises receiving the monitoring combination for scaling of the PDCCH monitoring capability via a radio resource control (RRC) signaling.

2. The method of claim 1, wherein the configured monitoring combination for scaling of the PDCCH monitoring capability is selected from the plurality of monitoring combinations indicated by the capability report.

3. The method of claim 1, wherein the first PDCCH monitoring capability comprises a slot-based PDCCH monitoring capability, and wherein the second PDCCH monitoring capability comprises a span-based PDCCH monitoring capability.

4. The method of claim 1, wherein the first PDCCH monitoring capability comprises a Release-15 PDCCH blind detection capability, and wherein the second PDCCH monitoring capability comprises a Release-16 PDCCH blind detection capability.

5. The method of claim 1, wherein the configured monitoring combination for scaling of the PDCCH monitoring capability is received in response to that a number of CCs configured is larger than the reported PDCCH monitoring capability.

6. The method of claim 1, wherein the determining comprises determining the monitoring budget by using the configured monitoring combination to scale the PDCCH monitoring capabilities.

7. The method of claim 1, wherein the configured monitoring combination is different from the plurality of monitoring combinations indicated by the capability report.

8. The method of claim 1, wherein the configured monitoring combination comprises a combination indicator of PDCCH blind detection under carrier aggregation.

9. The method of claim 1, wherein the determining comprises determining a first number of CCs to monitor with the first PDCCH monitoring capability and a second number of CCs to monitor with the second PDCCH monitoring capability.

10. An apparatus, comprising:
    a transceiver which, during operation, wirelessly communicates with a network node of a wireless network; and
    a processor communicatively coupled to the transceiver such that, during operation, the processor performs operations comprising:
       transmitting, via the transceiver, a capability report to indicate a plurality of monitoring combinations of physical downlink control channel (PDCCH) monitoring capabilities to a network node;
       receiving, via the transceiver, a monitoring combination configured by the network node based on the capability report;
       determining a monitoring budget by using the configured monitoring combination; and
       performing a PDCCH monitoring according to the monitoring budget by using the monitoring combination configured by the network node responsive to a number of component carriers (CCs) configured being larger than a reported capability,
    wherein each of the monitoring combinations comprises a first supported number of CCs with a first PDCCH monitoring capability and a second supported number of CCs with a second PDCCH monitoring capability, and
    wherein, in receiving the monitoring combination, the processor receives the monitoring combination for scaling of the PDCCH monitoring capability via a radio resource control (RRC) signaling.

11. The apparatus of claim 10, wherein the configured monitoring combination for scaling of the PDCCH monitoring capability is selected from the plurality of monitoring combinations indicated by the capability report.

12. The apparatus of claim 10, wherein the first PDCCH monitoring capability comprises a slot-based PDCCH monitoring capability, and wherein the second PDCCH monitoring capability comprises a span-based PDCCH monitoring capability.

13. The apparatus of claim 10, wherein the first PDCCH monitoring capability comprises a Release-15 PDCCH blind detection capability, and wherein the second PDCCH monitoring capability comprises a Release-16 PDCCH blind detection capability.

14. The apparatus of claim 10, wherein the configured monitoring combination for scaling of the PDCCH monitoring capability is received in response to that a number of CCs configured is larger than a reported PDCCH monitoring capability.

15. The apparatus of claim 10, wherein, in determining the monitoring budget, the processor determines the monitoring budget by using the configured monitoring combination to scale the PDCCH monitoring capabilities.

16. The apparatus of claim 10, wherein the configured monitoring combination is different from the plurality of monitoring combinations indicated by the capability report.

17. The apparatus of claim 10, wherein the configured monitoring combination comprises a combination indicator of PDCCH blind detection under carrier aggregation.

18. The apparatus of claim 10, wherein, in determining the monitoring budget, the processor determines a first number of CCs to monitor with the first PDCCH monitoring capability and a second number of CCs to monitor with the second PDCCH monitoring capability.

\* \* \* \* \*